US012753249B2

(12) United States Patent
Ahn et al.

(10) Patent No.: US 12,753,249 B2
(45) Date of Patent: Oct. 6, 2026

(54) CONTINUOUS POLYMERIZATION REACTOR FOR SUPER ABSORBENT POLYMER AND CONTINUOUS POLYMERIZATION REACTION SYSTEM

(71) Applicant: LG CHEM, LTD., Seoul (KR)

(72) Inventors: Gyunhyeok Ahn, Daejeon (KR); Yoon Jae Min, Daejeon (KR); Seul Ah Lee, Daejeon (KR); Gicheul Kim, Daejeon (KR); Hee Kwan Park, Daejeon (KR); Kyunghoon Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 725 days.

(21) Appl. No.: 18/023,671

(22) PCT Filed: Jun. 20, 2022

(86) PCT No.: PCT/KR2022/008729

§ 371 (c)(1),
(2) Date: Feb. 27, 2023

(87) PCT Pub. No.: WO2022/265478

PCT Pub. Date: Dec. 22, 2022

(65) Prior Publication Data

US 2024/0026040 A1 Jan. 25, 2024

(30) Foreign Application Priority Data

Jun. 18, 2021 (KR) ........................ 10-2021-0079644
Jun. 21, 2021 (KR) ........................ 10-2021-0080343
Jun. 20, 2022 (KR) ........................ 10-2022-0074623

(51) Int. Cl.
*C08F 2/01* (2006.01)
*B01J 20/26* (2006.01)
(Continued)

(52) U.S. Cl.
CPC ............... *C08F 2/01* (2013.01); *B01J 20/261* (2013.01); *B01J 20/267* (2013.01);
(Continued)

(58) Field of Classification Search
CPC ... B01J 4/02; B01J 20/261; B01J 4/008; B01J 2219/185; B01J 2219/1943; C08F 2/01; C08J 3/075
(Continued)

(56) References Cited

U.S. PATENT DOCUMENTS 311,626 A 2/1885 Wilson
351,617 A 10/1886 Anderson
(Continued)

FOREIGN PATENT DOCUMENTS

CH 604894 A5 9/1978
CN 2327443 Y 7/1999
(Continued)

OTHER PUBLICATIONS

Extended European Search Report dated Aug. 19, 2024, of the corresponding European Patent Application No. 22825394.4.
(Continued)

*Primary Examiner* — Fred M Teskin
(74) *Attorney, Agent, or Firm* — Morgan, Lewis & Bockius LLP

(57) ABSTRACT

A continuous polymerization reactor for super absorbent polymer is disclosed. The continuous polymerization reactor includes a cylindrical body; a discharge part with a diameter decreasing downward, positioned at a lower part of the body; an inlet positioned at an upper part of and connected to the body, into which a monomer composition is introduced; an outlet positioned at a lower part of the discharge part, from which hydrogel polymer is discharged; and a discharge valve opening or closing the outlet, wherein a ratio
(Continued)

(H1/D1) of a sum (H1) of a height of the body and a height of the discharge part to a diameter (D1) of the body is 2 to 4. In addition, a continuous polymerization reaction system comprising the continuous polymerization reactor is also disclosed.

5 Claims, 2 Drawing Sheets

(51) Int. Cl.
*B01J 20/28* (2006.01)
*C08F 120/06* (2006.01)

(52) U.S. Cl.
CPC ....... *B01J 20/28047* (2013.01); *C08F 120/06* (2013.01); *B01J 2220/68* (2013.01)

(58) Field of Classification Search
USPC .................................................. 526/918, 930
See application file for complete search history.

(56) References Cited

U.S. PATENT DOCUMENTS

| | | | |
|---|---|---|---|
| 1,122,055 A | 12/1914 | Asbury | |
| 2,218,119 A | 10/1940 | Mcallister | |
| 3,542,104 A | 11/1970 | Anderson et al. | |
| 3,779,565 A | 12/1973 | Witte | |
| 3,905,122 A | 9/1975 | Ohshima et al. | |
| 4,027,824 A | 6/1977 | Fuller | |
| 4,253,613 A | 3/1981 | Reinhall | |
| 4,269,362 A | 5/1981 | Berggren | |
| 4,497,930 A | 2/1985 | Yamasaki et al. | |
| RE32,649 E | 4/1988 | Brandt et al. | |
| 4,844,372 A | 7/1989 | Weiler et al. | |
| 4,883,478 A | 11/1989 | Lerailler et al. | |
| 4,908,101 A | 3/1990 | Frisk et al. | |
| 5,042,726 A | 8/1991 | Reinhall | |
| 5,629,034 A | 5/1997 | Terada et al. | |
| 5,633,329 A | 5/1997 | Hahnle et al. | |
| 5,686,698 A | 11/1997 | Mahadevan et al. | |
| 5,837,789 A | 11/1998 | Stockhausen et al. | |
| 5,875,982 A | 3/1999 | Underberg | |
| 6,060,557 A | 5/2000 | Dahmen et al. | |
| 6,133,193 A | 10/2000 | Kajikawa et al. | |
| 6,229,062 B1 | 5/2001 | Mandell et al. | |
| 6,299,084 B1 | 10/2001 | Virving | |
| 6,325,308 B1 | 12/2001 | Lofgren et al. | |
| 6,914,105 B1 | 7/2005 | Charpentier et al. | |
| 8,785,583 B2 * | 7/2014 | Funk | C08F 220/20 526/318.4 |
| 8,829,135 B2 * | 9/2014 | Funk | C08F 220/06 526/317.1 |
| 9,803,033 B2 | 10/2017 | Funk et al. | |
| 10,730,028 B2 | 8/2020 | Kotake et al. | |
| 2001/0025093 A1 | 9/2001 | Ishizaki et al. | |
| 2003/0071153 A1 | 4/2003 | Aikawa | |
| 2004/0009288 A1 | 1/2004 | Eketorp et al. | |
| 2004/0009688 A1 | 1/2004 | Eketorp et al. | |
| 2004/0092688 A1 | 5/2004 | Dairoku et al. | |
| 2004/0181031 A1 | 9/2004 | Nogi et al. | |
| 2004/0242764 A1 | 12/2004 | Yamada et al. | |
| 2009/0208748 A1 | 8/2009 | Torii et al. | |
| 2010/0249320 A1 | 9/2010 | Matsumoto et al. | |
| 2011/0290920 A1 | 12/2011 | Kim et al. | |
| 2011/0319518 A1 | 12/2011 | Kadonaga et al. | |
| 2012/0108695 A1 | 5/2012 | Won et al. | |
| 2012/0172536 A1 | 7/2012 | Nogi et al. | |
| 2012/0202952 A1 | 8/2012 | Funk et al. | |
| 2012/0258851 A1 | 10/2012 | Nakatsuru et al. | |
| 2012/0289607 A1 | 11/2012 | Xiong et al. | |
| 2012/0315675 A1 | 12/2012 | Medoff et al. | |
| 2013/0026412 A1 | 1/2013 | Machida et al. | |
| 2014/0241108 A1 | 8/2014 | Stöppler | |
| 2014/0339344 A1 | 11/2014 | Kim et al. | |
| 2014/0371400 A1 | 12/2014 | Tachi et al. | |
| 2015/0136888 A1 | 5/2015 | Matsumoto et al. | |
| 2016/0199529 A1 | 7/2016 | Torii et al. | |
| 2016/0208022 A1 | 7/2016 | Kim et al. | |
| 2016/0311985 A1 | 10/2016 | Jung et al. | |
| 2017/0029546 A1 | 2/2017 | Langlotz | |
| 2017/0081442 A1 | 3/2017 | Johnson et al. | |
| 2017/0267793 A1 | 9/2017 | Imura et al. | |
| 2018/0298132 A1 | 10/2018 | Yorino et al. | |
| 2019/0001302 A1 | 1/2019 | Shuto et al. | |
| 2019/0105628 A1 | 4/2019 | Kotake et al. | |
| 2019/0201868 A1 | 7/2019 | Wakabayashi et al. | |
| 2019/0224645 A1 | 7/2019 | Kim et al. | |
| 2019/0275192 A1 | 9/2019 | Torii et al. | |
| 2019/0276609 A1 | 9/2019 | Lee et al. | |
| 2019/0329219 A1 | 10/2019 | Watabe et al. | |
| 2019/0329220 A1 | 10/2019 | Watabe et al. | |
| 2019/0338082 A1 | 11/2019 | Iwamura et al. | |
| 2020/0246222 A1 | 8/2020 | Malanga et al. | |
| 2020/0316549 A1 | 10/2020 | Kotake et al. | |
| 2020/0393318 A1 | 12/2020 | Okawa et al. | |
| 2020/0398253 A1 | 12/2020 | Kawada et al. | |
| 2020/0406228 A1 | 12/2020 | Min et al. | |
| 2021/0009725 A1 | 1/2021 | Nam et al. | |
| 2021/0115198 A1 | 4/2021 | Yorino et al. | |
| 2021/0147637 A1 | 5/2021 | Matsumoto et al. | |
| 2021/0147640 A1 | 5/2021 | Hur et al. | |
| 2021/0230316 A1 | 7/2021 | Won et al. | |
| 2021/0269606 A1 | 9/2021 | Wakabayashi et al. | |
| 2021/0317237 A1 | 10/2021 | Chung et al. | |
| 2021/0340301 A1 | 11/2021 | Kim et al. | |
| 2021/0347924 A1 * | 11/2021 | El-Toufaili | C12P 13/02 |
| 2022/0111352 A1 | 4/2022 | Kimura et al. | |
| 2022/0193626 A1 | 6/2022 | Enomura | |
| 2022/0234015 A1 | 7/2022 | Enomura | |
| 2022/0258380 A1 | 8/2022 | Choi et al. | |
| 2022/0379521 A1 | 12/2022 | Woo et al. | |
| 2023/0097487 A1 | 3/2023 | Yorino et al. | |
| 2023/0338925 A1 | 10/2023 | Chung et al. | |
| 2023/0381788 A1 | 11/2023 | Chung et al. | |
| 2025/0196155 A1 | 6/2025 | Jöchner et al. | |

FOREIGN PATENT DOCUMENTS

| | | |
|---|---|---|
| CN | 2480050 Y | 3/2002 |
| CN | 1872890 A | 12/2006 |
| CN | 101878816 A | 11/2010 |
| CN | 201728110 U | 2/2011 |
| CN | 102482433 A | 5/2012 |
| CN | 102639229 A | 8/2012 |
| CN | 113828181 B | 9/2013 |
| CN | 103958039 A | 7/2014 |
| CN | 104028718 A | 9/2014 |
| CN | 104207258 A | 12/2014 |
| CN | 105452306 A | 3/2016 |
| CN | 107029575 A | 8/2017 |
| CN | 207533357 U | 6/2018 |
| CN | 108554595 A | 9/2018 |
| CN | 109843934 A | 6/2019 |
| CN | 210787668 U | 6/2020 |
| CN | 210880398 U | 6/2020 |
| CN | 112204091 A | 1/2021 |
| CN | 212396873 U | 1/2021 |
| CN | 112839993 A | 5/2021 |
| DE | 2931275 A1 | 2/1980 |
| DE | 10017899 A1 | 10/2001 |
| DE | 20 2014 105 679 U1 | 1/2015 |
| EP | 0096790 A1 | 12/1983 |
| EP | 0648537 A1 | 4/1995 |
| EP | 0778370 A1 | 6/1997 |
| EP | 1 130 045 A2 | 9/2001 |
| EP | 1147804 A1 | 10/2001 |
| EP | 1302590 A1 | 4/2003 |
| EP | 2189478 A1 | 5/2010 |
| EP | 2557095 A1 | 2/2013 |
| EP | 3312218 A1 | 4/2018 |
| EP | 3473664 A1 | 4/2019 |
| EP | 3521343 A1 | 8/2019 |

(56) References Cited

FOREIGN PATENT DOCUMENTS

| | | | |
|---|---|---|---|
| EP | 3543279 | A1 | 9/2019 |
| EP | 3543280 | A1 | 9/2019 |
| EP | 3711722 | A1 | 9/2020 |
| EP | 3757153 | A1 | 12/2020 |
| EP | 3795616 | A1 | 3/2021 |
| EP | 3812420 | A1 | 4/2021 |
| EP | 3842477 | A1 | 6/2021 |
| EP | 3939756 | A1 | 1/2022 |
| EP | 3984711 | A1 | 4/2022 |
| EP | 4000736 | A1 | 5/2022 |
| EP | 4 197 639 | A1 | 6/2023 |
| EP | 4253451 | A1 | 10/2023 |
| EP | 4 321 559 | A1 | 2/2024 |
| EP | 4324868 | A1 | 2/2024 |
| EP | 4 332 121 | A1 | 3/2024 |
| EP | 4393991 | A1 | 7/2024 |
| FR | 2679789 | A1 | 2/1993 |
| GB | 2536502 | A | 9/2016 |
| JP | S59-30826 | A | 2/1984 |
| JP | S62-286559 | A | 12/1987 |
| JP | H01-321989 | A | 12/1989 |
| JP | H03-76721 | A | 4/1991 |
| JP | H07-9176 | A | 1/1995 |
| JP | H08-17954 | B2 | 2/1996 |
| JP | H09-067404 | A | 3/1997 |
| JP | H10-137615 | A | 5/1998 |
| JP | 2783048 | B2 | 8/1998 |
| JP | H11-028375 | A | 2/1999 |
| JP | H11-188726 | A | 7/1999 |
| JP | 2000-63527 | A | 2/2000 |
| JP | 2000-143720 | A | 5/2000 |
| JP | 2002-177807 | A | 6/2002 |
| JP | 2002-543243 | A | 12/2002 |
| JP | 2003-82107 | A | 3/2003 |
| JP | 2004-300425 | A | 10/2004 |
| JP | 2007-2067 | A | 1/2007 |
| JP | 2007-071415 | A | 3/2007 |
| JP | 2007-77393 | A | 3/2007 |
| JP | 2008-038128 | A | 2/2008 |
| JP | 2009-52009 | A | 3/2009 |
| JP | 4727005 | B2 | 7/2011 |
| JP | 2012-525454 | A | 10/2012 |
| JP | 2013-507465 | A | 3/2013 |
| JP | 5551836 | B2 | 7/2014 |
| JP | 5619010 | B2 | 11/2014 |
| JP | 2015-221910 | A | 12/2015 |
| JP | 2016-124901 | A | 7/2016 |
| JP | 2017-155194 | A | 9/2017 |
| JP | 2017-197703 | A | 11/2017 |
| JP | 2018-527453 | A | 9/2018 |
| JP | 2018-203997 | A | 12/2018 |
| JP | 2019-052285 | A | 4/2019 |
| JP | 2019-141754 | A | 8/2019 |
| JP | 6650162 | B1 | 2/2020 |
| JP | 6685066 | B1 | 4/2020 |
| JP | 2020-175379 | A | 10/2020 |
| JP | WO 2020/213192 | A1 | 10/2020 |
| JP | 2022-541140 | A | 9/2022 |
| KR | 10-0180956 | B1 | 4/1999 |
| KR | 20-0252158 | Y1 | 11/2001 |
| KR | 10-2005-0018471 | A | 2/2005 |
| KR | 10-0823419 | B1 | 4/2008 |
| KR | 10-0874695 | B1 | 12/2008 |
| KR | 10-0904050 | B1 | 6/2009 |
| KR | 10-0913875 | B1 | 8/2009 |
| KR | 10-2009-0094416 | | 9/2009 |
| KR | 20-0446736 | Y1 | 11/2009 |
| KR | 10-2011-0003258 | A | 1/2011 |
| KR | 10-2011-0082133 | A | 7/2011 |
| KR | 10-2011-0131131 | A | 12/2011 |
| KR | 10-2011-0137081 | A | 12/2011 |
| KR | 10-2011-0138635 | A | 12/2011 |
| KR | 10-1280582 | B1 | 7/2013 |
| KR | 10-2013-0096218 | A | 8/2013 |
| KR | 10-2015-0016241 | A | 2/2015 |
| KR | 10-2015-0019319 | A | 2/2015 |
| KR | 10-2015-0067729 | A | 6/2015 |
| KR | 10-1546919 | B1 | 8/2015 |
| KR | 10-2015-0141424 | A | 12/2015 |
| KR | 10-2015-0141425 | A | 12/2015 |
| KR | 10-2016-0020864 | A | 2/2016 |
| KR | 10-2016-0078114 | A | 7/2016 |
| KR | 10-1645684 | B1 | 8/2016 |
| KR | 10-2016-0149235 | A | 12/2016 |
| KR | 10-2017-0068276 | | 6/2017 |
| KR | 10-2017-0095268 | A | 8/2017 |
| KR | 10-2018-0127377 | A | 11/2018 |
| KR | 10-2019-0027682 | A | 3/2019 |
| KR | 10-2019-0031483 | A | 3/2019 |
| KR | 10-2019-0069101 | A | 6/2019 |
| KR | 10-2019-0077540 | A | 7/2019 |
| KR | 10-2019-0077541 | A | 7/2019 |
| KR | 10-2015675 | B1 | 8/2019 |
| KR | 10-2020-0007270 | A | 1/2020 |
| KR | 10-2020-0055648 | A | 5/2020 |
| KR | 10-2020-0056050 | A | 5/2020 |
| KR | 10-2020-0068376 | A | 6/2020 |
| KR | 10-2020-0116770 | A | 10/2020 |
| KR | 10-2021-0010504 | A | 1/2021 |
| KR | 10-2021-0013101 | A | 2/2021 |
| KR | 10-2021-0033876 | A | 3/2021 |
| KR | 10-2021-0046570 | A | 4/2021 |
| KR | 10-2021-0062459 | A | 5/2021 |
| KR | 10-2025-0081347 | A | 6/2025 |
| WO | 87/03208 | A1 | 6/1987 |
| WO | 87/06496 | A1 | 11/1987 |
| WO | 91/07228 | A1 | 5/1991 |
| WO | 1996/013542 | A1 | 5/1996 |
| WO | 97/38740 | A1 | 10/1997 |
| WO | 03/104286 | A1 | 12/2003 |
| WO | 2010/040467 | A1 | 4/2010 |
| WO | 2011/024971 | A1 | 3/2011 |
| WO | 2011/078298 | A1 | 6/2011 |
| WO | 2011/157656 | A3 | 7/2012 |
| WO | 2013/161229 | A1 | 10/2013 |
| WO | 2015/030130 | A1 | 3/2015 |
| WO | 2015/163508 | A1 | 10/2015 |
| WO | 2016/105119 | A1 | 6/2016 |
| WO | 2016/204302 | A1 | 12/2016 |
| WO | 2017/115861 | A1 | 7/2017 |
| WO | 2017/169246 | A1 | 10/2017 |
| WO | 2018/092863 | A1 | 5/2018 |
| WO | 2018/092864 | A1 | 5/2018 |
| WO | 2018-147317 | A1 | 8/2018 |
| WO | 2018/174175 | A1 | 9/2018 |
| WO | 2019/111812 | A1 | 6/2019 |
| WO | 2019/181410 | A1 | 9/2019 |
| WO | 2019/221154 | A1 | 11/2019 |
| WO | 2019/221236 | A1 | 11/2019 |
| WO | 2020-067310 | A1 | 4/2020 |
| WO | 2020079152 | A1 | 4/2020 |
| WO | 2020-144948 | A1 | 7/2020 |
| WO | 2020/145384 | A1 | 7/2020 |
| WO | 2020/213192 | A1 | 10/2020 |
| WO | 2020/216433 | A1 | 10/2020 |
| WO | 2021/054564 | A1 | 3/2021 |
| WO | 2021/075921 | A1 | 4/2021 |
| WO | 2021/101277 | A1 | 5/2021 |
| WO | 2022/265476 | A1 | 12/2022 |
| WO | 2023/149681 | A1 | 8/2023 |

OTHER PUBLICATIONS

Extended European Search Report dated Sep. 16, 2024, of the corresponding European Patent Application No. 22825396.9.

Extended European Search Report dated Sep. 26, 2024, of the corresponding European Patent Application No. 22825395.1.

Extended European Search Report issued in application 22825391.0 dated Apr. 5, 2024.

Office Action dated Jun. 4, 2024, of the corresponding Chinese Patent Application No. 202280006910.3.

Extended European Search Report dated Jun. 24, 2024, of the corresponding European Patent Application No. 22825382.9.

(56) References Cited

OTHER PUBLICATIONS

Office Action dated Sep. 30, 2024 issued in the corresponding Chinese Patent Application No. 202280006016.6.
Conduction Flow Dryer manufactured by Okawara Manufacturing Co., Ltd., retrieved from www.okawara.co.jp/produts/156.
Edana Standard Test method—WSP 270.3 (10) (cited by third party observation filed in KR 2022-008723 dated Oct. 17, 2023).
Edana Standard Test method—WSP 242.3.10, WSP 241.3.10 (cited by third party observation filed in KR 2022-008723 dated Oct. 17, 2023).
Buchholz et al., Modern Superabsorbent Polymer Technology, Wiley-Vch (cited by third party observation filed in KR 2022-008723 dated Oct. 17, 2023).
Database WPI, 2017, Clarivate Analytics, Thomson Scientific, AN 2007-305627, p. 1-2, XP 002810991.
Zaquen, et al., "Polymer Synthesis in Continuous Flow Reactors," Progress in Polymer Science, vol. 107, p. 1-40, 2020, XP 086212084.
Extended European Search Report issued Feb. 12, 2024 for European Patent Application No. 22825401.7.
Extended European Search Report issued Mar. 5, 2024 for European Patent Application No. 22825389.4.
Notice of Allowance dated Sep. 15, 2025 issued in corresponding U.S. Appl. No. 18/031,871.
Extended European Search Report dated Dec. 22, 2023, of the corresponding European Patent Application No. 22825399.3.
Extended European Search Report dated Dec. 15, 2023, of the corresponding European Patent Application No. 22825400.9.
Office Action dated Jan. 28, 2025 issued in related Japanese Patent Application No. 2023-539357.
Office Action dated May 8, 2025, issued in related U.S. Appl. No. 18/031,871.
Office Action dated Jan. 2, 2025 issued in related Chinese Patent Application No. 202280006910.3.
Office Action dated Jan. 13, 2025 issued in related Korean Patent Application No. 10-2022-007462.
Office Action dated Jan. 16, 2025 issued in related U.S. Appl. No. 18/023,648.
Office Action dated Dec. 2, 2025 issued in related Japanese Application No. 2023-572206.
Schwalm, "UV Coatings Basics, Recent Developments and New Applications," Elsevier, p. 115, (2006).
Odian, "Principles of Polymerization," Second Edition, A Wiley-Interscience Publication, John Wiley & Sons, Inc., p. 203, (1981).
International Search Report and Written Opinion dated Sep. 23, 2022 issued in corresponding International Patent Application No. PCT/KR2022/008729.
Office Action and Search Report dated Mar. 21, 2026 issued in the corresponding Chinese Patent Application No. 202280005617.5.
Office Action issued in corresponding U.S. Appl. No. 18/566,082, dated Jun. 9, 2026.
Jack Yuan, "Rotary dryer working principle", 2020, Palet, Bio Pellet Machines, 8 pages.
Office Action issued in corresponding European Patent Application No. 22 825 399.3, dated Jul. 20, 2026.
Office Action issued in corresponding U.S. Appl. No. 18/566,080, dated Aug. 25, 2026.
Notice of Allowance issued in corresponding U.S. Appl. No. 18/033,296, dated Aug. 28, 2026.

* cited by examiner

【FIG. 1】
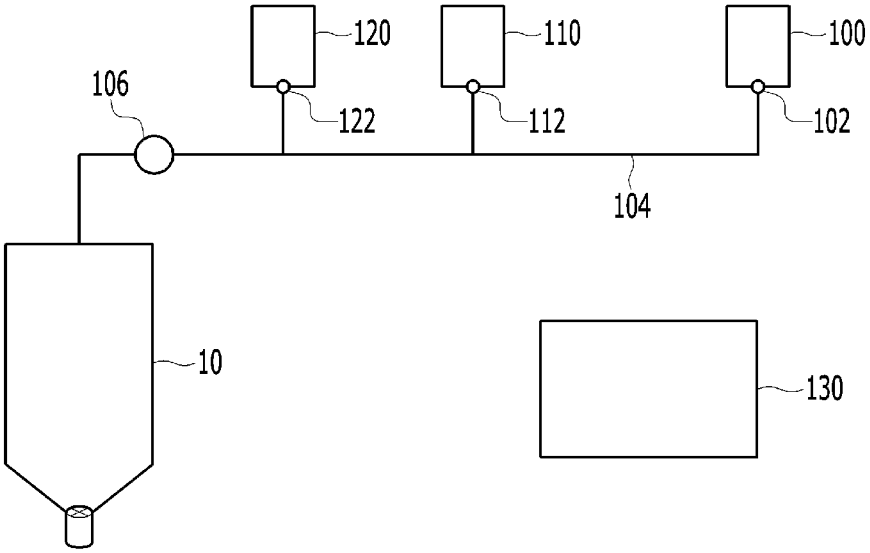

【FIG. 2】
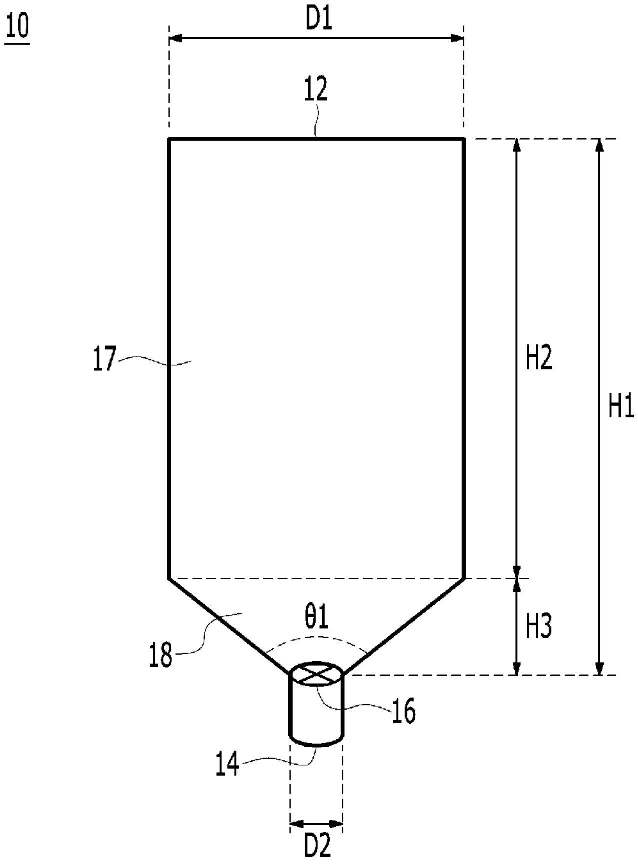

CONTINUOUS POLYMERIZATION REACTOR FOR SUPER ABSORBENT POLYMER AND CONTINUOUS POLYMERIZATION REACTION SYSTEM

CROSS-REFERENCE TO RELATED APPLICATION(S)

This application claims the benefit of Korean Patent Application No. 10-2021-0079644 filed on Jun. 18, 2021, Korean Patent Application No. 10-2021-0080343 filed on Jun. 21, 2021, and Korean Patent Application No. 10-2022-0074623 filed on Jun. 20, 2022 with the Korean Intellectual Property Office, the disclosures of which are herein incorporated by reference in their entirety.

TECHNICAL FIELD

This invention relates to a continuous polymerization reactor for super absorbent polymer and a continuous polymerization reaction system comprising the same, and more specifically, to a continuous polymerization reactor for super absorbent polymer that can improve productivity and has high property reproducibility, and a continuous polymerization reaction system comprising the same.

BACKGROUND

Super absorbent polymer (SAP) is polymer material in the form of white powder prepared by reacting acrylic acid with caustic soda, and it can absorb moisture of about five hundred to thousand times of its own weight. The super absorbent polymer is synthetic polymer material that is transformed to a jelly-like form, if it absorbs water, and can store water without discharging, even if a certain degree of pressure is applied from the outside.

Super absorbent polymer molecules have a network structure, and due to many pores between the molecules, easily absorb water. Due to concentration difference between ions in the super absorbent polymer and water, water moves inside super absorbent polymer (by osmosis). If water molecules are introduced inside super absorbent polymer, anions fixed inside try to occupy a specific space by repulsive force, and thus, the space of polymer chains expands and more water can be absorbed (electrostatic repulsion).

Such super absorbent polymer began to be commercialized as sanitary items, and currently, is being widely used as water-holding material for soil, water stop material for civil engineering and architecture, sheets for raising seedling, freshness preservatives in the field of food circulation, fomentation material, and the like, besides hygiene products such as paper diapers for children, and the like.

Super absorbent polymer is marketed as powder products after drying and grinding hydrogel or hydrogel polymer obtained through a polymerization reaction in a polymerization reactor.

According to the prior art, hydrogel or hydrogel polymer was obtained using a batch polymerization reactor. However, using the batch polymerization reactor, it takes a substantial amount of time until the polymerization reaction is completed after introducing a monomer composition, so as to obtain hydrogel or hydrogel polymer. Thus, it was difficult to obtain a sufficient output with the batch polymerization reactor.

In order to overcome such an insufficient output, plural batch polymerization reactors may be used, but in this case, a larger space is required to install plural polymerization reactors, and property difference may be generated between hydrogels or hydrogel polymers obtained in each batch polymerization reactor.

The background part has been described for better understanding of the background of the invention, and may comprise information other than prior art, already known to an ordinary skilled person in the art.

DETAILED DESCRIPTION OF THE INVENTION

Technical Problem

It is an object of the invention to provide a continuous polymerization reactor for super absorbent polymer in which introduction of a monomer composition and discharge of produced hydrogel or hydrogel polymer are simultaneously conducted, thereby improving productivity and exhibiting high property reproducibility, and a continuous polymerization reaction system comprising the same.

Technical Solution

A continuous polymerization reactor for super absorbent polymer according to an embodiment of the invention may include: a cylindrical body; a discharge part with a diameter decreasing downward, positioned at a lower part the body; an inlet positioned at an upper part of and connected to the body, into which a monomer composition is introduced; an outlet positioned at a lower part of the discharge part, from which hydrogel polymer is discharged; and a discharge valve for opening or closing the outlet, wherein a ratio (H1/D1) of a sum (H1) of a height of the body and a height of the discharge part to a diameter (D1) of the body may be 2 to 4.

The monomer composition may be continuously introduced into the inlet with a predetermined flow rate, and the discharge valve may control an open rate of the outlet such that hydrogel polymer may be continuously discharged from the outlet with the same flow rate as the predetermined flow rate.

The discharge valve may close the outlet, and open the outlet if a predetermined time passes from a time when the final monomer composition begins to be introduced, or a predetermined volume of the final monomer composition is introduced.

A continuous polymerization reaction system according to another embodiment of the invention may include: a first vessel in which water soluble ethylenically unsaturated monomers having acid groups, a solvent, and an internal crosslinking agent are stored; a second vessel in which a part of a polymerization initiator is stored; a third vessel in which the other part of the polymerization initiator is stored; a continuous polymerization reactor including an inlet positioned at an upper part of the continuous polymerization reactor, into which a monomer composition including the water soluble ethylenically unsaturated monomers having acid groups, the solvent, the internal crosslinking agent and the polymerization initiator is introduced, and an outlet positioned at a lower part of the continuous polymerization reactor, from which hydrogel polymer formed by polymerization of the monomer composition is discharged; a feed pipe connected to the inlet so as to introduce the final monomer composition; a first feed valve for selectively connecting the first vessel with the feed pipe; a second feed valve for selectively connecting the second vessel with the feed pipe; a third feed valve for selectively connecting the third vessel with the feed pipe; a discharge valve for opening or closing the outlet; and a controller for controlling the operations of the first, second, and third feed valves and the discharge valve; wherein the controller may control the first, second, and third feed valves such that the final monomer composition may be continuously introduced through the inlet with a predetermined flow rate, and control the discharge valve such that the hydrogel polymer may be continuously discharged with the same flow rate as the predetermined flow rate.

The controller may control the discharge valve to close the outlet, and open the first, second, and third feed valves such that the final monomer composition may be continuously introduced into the inlet.

The controller may control the discharge valve to open the outlet when a predetermined time is passed from a time when the final monomer composition begins to be introduced, or a predetermined volume of the final monomer composition is introduced.

The first, second, and third vessels may be arranged in the order of the third, second, and first vessels from the continuous polymerization reactor.

The continuous polymerization reactor comprises a cylindrical body, and a discharge part with a diameter decreasing downward, positioned at a lower part of the body, and a ratio (H1/D1) of a sum (H1) of a height of the body and a height of the discharge part to a diameter (D1) of the body may be 2 to 4.

Advantageous Effects

According to the embodiment of the invention, introduction of a monomer composition and discharge of produced hydrogel or hydrogel polymer may be simultaneously conducted, thereby improving productivity and preparing super absorbent polymer with uniform properties.

And, due to productivity improvement, there is no need to use plural polymerization reactors, thus obviating a need for large facility space, and making quality management convenient.

And, by optimizing the ratio of the height to diameter of the polymerization reactor, the properties of super absorbent polymer may be improved.

Besides, effects obtained or expected from the embodiments of the invention will be directly or implicitly disclosed in the detailed description of the invention. That is, various effects expected from the embodiments of the invention will be disclosed in the detailed description later.

BRIEF DESCRIPTION OF THE DRAWINGS

The embodiments of the invention will be better understood referring to attached drawings where similar reference numerals indicate identical or functionally similar elements, and related explanations below.

FIG. 1 is a schematic diagram of the continuous polymerization reaction system for super absorbent polymer according to the embodiment of the invention.

FIG. 2 is a schematic diagram of the continuous polymerization reactor for super absorbent polymer according to the embodiment of the invention.

It should be understood that drawings referred above are not necessarily shown to scale, but present simple expression of various preferred characteristics illustrating basic principle. For example, specific design characteristics of the invention including specific dimension, direction, location and shape will be partly determined by specifically intended application and use environment.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended. As used herein, the terms "comprise", "comprising", "contains", "containing", etc. are intended to designate the existence of practiced characteristic, number, step, constructional element or combinations thereof, and they are not intended to preclude the possibility of existence or addition of one or more other characteristics, numbers, steps, constructional elements or combinations thereof. As used herein, the term "and/or" includes one of enumerated items in connection, or all the combinations.

As used herein, the term "polymer" means a polymerized state of water soluble ethylenically unsaturated monomers, and it may include those of all moisture content ranges or particle diameter ranges. Among the polymers, polymer after polymerization and before drying, and having a moisture content of about 40 wt % or more, may be referred to as hydrogel polymer.

And, the term "super absorbent polymer" means the polymer or base resin itself, or is used to include the polymer or base resin made appropriate for productization through additional process, for example, surface crosslinking, fine particles reassembling, drying, grinding, classification, and the like.

In addition, it is understood that one or more of the following methods or aspects thereof may be carried out by at least one controller. The term "controller" may refer to a hardware device comprising memory and processor. The memory is construed to store program instructions, and is particularly programmed to perform the program instructions so as to conduct one or more processes described in detail later. The controller, as described herein, may control the operations of units, modules, parts, devices, or similar ones. And, it is understood that the following methods may be carried out by a device comprising a controller and one or more other components, as recognized by an ordinary skilled person.

And, the controller as disclosed herein may be realized as a non-transitory computer-readable recording medium comprising executable program instructions executed by a processor. The examples of the computer-readable recording media include ROM, RAM, cd, magnetic tape, floppy disks, flash drives, smart cards and optical data storage devices, but are not limited thereto. The computer-readable recording medium may be dispersed throughout the computer network such that program instructions may be stored and executed by a dispersion method such as telematics server or Controller Area Network (CAN), for example.

The continuous polymerization reactor for super absorbent polymer and continuous polymerization reaction system according to the embodiments of the invention can improve productivity and prepare super absorbent polymer with uniform properties, because introduction of a monomer composition and discharge of produced hydrogel or hydrogel polymer are simultaneously conducted.

Hereinafter, the continuous polymerization reactor for super absorbent polymer and continuous polymerization reaction system according to the embodiments of the invention will be explained in detail referring to attached drawings.

The preparation apparatus of super absorbent polymer according to the embodiment of the invention comprises a polymerization reactor, a chopper, a dryer, a grinder, and a surface crosslinking device.

The polymerization reactor induces a polymerization reaction of a monomer composition in the presence of an internal crosslinking agent and a polymerization initiator to form hydrogel polymer.

The polymerization reaction is a reaction wherein a monomer composition comprising water soluble ethylenically unsaturated monomers having acid groups, an internal crosslinking agent and a polymerization initiator is subjected to polymerization, to form polymer in which the water soluble ethylenically unsaturated monomers having acid groups and internal crosslinking agent are crosslinked.

The water soluble ethylenically unsaturated monomers making up the crosslinked polymer may be any monomers commonly used in the preparation of super absorbent polymer. As non-limiting examples, the water soluble ethylenically unsaturated monomers may be a compound represented by the following Chemical Formula 1:

$$R^1\text{—COOM}^1 \qquad \text{[Chemical Formula 1]}$$

In the Chemical Formula 1, $R^1$ is a C2-5 alkyl group comprising unsaturated bond, $M^1$ is a hydrogen atom, monovalent or divalent metal, an ammonium group or an organic amine salt.

Preferably, the monomer may be one or more selected from the group consisting of acrylic acid, methacrylic acid, and monovalent (alkali) metal salt, divalent metal salt, ammonium salt and organic amine salt of these acids. As such, in case acrylic acid and/or a salt thereof is used as water soluble ethylenically unsaturated monomers, super absorbent polymer with improved absorption property may be obtained. Besides, as the monomers, anionic monomers and salts thereof such as maleic anhydride, fumaric acid, crotonic acid, itaconic acid, 2-acryloylethane sulfonic acid 2-methacryloylethane sulfonic acid, 2-methacryloylpropane sulfonic acid, or 2-methacrylamide-2-methylpropane sulfonic acid; non-ionic hydrophilic containing monomers such as methacrylamide, N-substituted(meth)acrylate, 2-hydroxyethyl methacrylate, 2-hydroxypropyl methacrylate, methoxy polyethylene glycol methacrylate, polyethylene glycol methacrylate; and amino group containing unsaturated monomers and quarternarized products thereof, such as (N,N)-dimethylaminoethyl.

Wherein, the water soluble ethylenically unsaturated monomers have acid groups. In the conventional preparation method of super absorbent polymer, monomers in which at least a part of the acid groups had been neutralized by a neutralization agent were subjected to crosslinking polymerization to form hydrogel polymer. Specifically, in the step of mixing the water soluble ethylenically unsaturated monomers having acid groups, internal crosslinking agent, polymerization initiator and neutralization agent, at least a part of the acid groups of the water soluble ethylenically unsaturated monomers were neutralized.

However, according to one embodiment of the invention, while the acid groups of the water soluble ethylenically unsaturated monomers are not neutralized, polymerization is first conducted to form polymer.

The water soluble ethylenically unsaturated monomers (for example, acrylic acid), of which acid groups are not neutralized, are liquid at room temperature and have high miscibility with a solvent (water), and thus, exist in the state of a mixed solution in the monomer composition. However, water soluble ethylenically unsaturated monomers, of which acid groups are neutralized, are solid at room temperature, and have different solubilities according to the temperature of a solvent (water), and the solubility is lower as the temperature is lower.

As such, the water soluble ethylenically unsaturated monomers (for example, acrylic acid), of which acid groups are not neutralized, have higher solubility to or miscibility with a solvent (water) than the monomers of which acid groups are neutralized, and are not extracted even at low temperature, and thus, are favorable for polymerization for a long time at low temperature. Thus, by conducting polymerization for a long time using the water soluble ethylenically unsaturated monomers (for example, acrylic acid), of which acid groups are not neutralized, polymer having higher molecular weight and uniform molecular weight distribution may be stably formed.

And, polymer of longer chain can be formed, thus achieving the effect for reducing extractable contents that exist in non-crosslinked state due to incomplete polymerization or crosslinking.

And, as such, if polymerization is first conducted while the acid groups of the monomers are not neutralized, to form polymer, and the polymer is micronized in the presence of a surfactant after neutralization, or the acid groups existing in the polymer are neutralized simultaneously with micronization, the surfactant may exist on the surface of the polymer in large quantities, and sufficiently perform a function for lowering adhesion of polymer.

In the monomer composition, the concentration of the water soluble ethylenically unsaturated monomers may be appropriately controlled considering polymerization time and reaction conditions, and the like, and it may be controlled to about 20 to about 60 wt %, or about 40 to about 50 wt %.

As used herein the term 'internal crosslinking agent' is used to distinguish from a surface crosslinking agent for crosslinking the surface of super absorbent polymer particles described later, and it functions for introducing crosslinks between unsaturated bonds of the above explained water soluble ethylenically unsaturated monomers, to form polymer comprising a crosslink structure.

In this step, crosslinking is progressed without distinction of a surface and inside, but in case a surface crosslinking process of super absorbent polymer is progressed as described later, the surface of the finally prepared super absorbent polymer particles may comprise a structure newly crosslinked by the surface crosslinking agent, and the inside of the super absorbent polymer particles may maintain the structure crosslinked by the internal crosslinking agent.

According to one embodiment of the invention, as the internal crosslinking agent, one or more of multifunctional acrylate-based compounds, multifunctional allyl-based compounds, or multifunctional vinyl-based compounds may be used.

As non-limiting examples of the multifunctional acrylate-based compounds, ethyleneglycol dimethacrylate, diethyleneglycol dimethacrylate, triethyleneglycol dimethacrylate, tetraethyleneglycol dimethacrylate, polyethyleneglycol dimethacrylate, propyleneglycol dimethacrylate, tripropyleneglycol dimethacrylate, polylpropyleneglycol dimethacrylate, butanediol dimethacrylate, butyleneglycol dimethacrylate, hexanediol dimethacrylate, pentaerythritol dimethacrylate, pentaerythritol tri(meth)acrylate, pentaerythritol tetramethacrylate, dipentaerythritol dimethacrylate, dipentaerythritol trimethacrylate, dipentaerythritol tetra (meth)acrylate, dipentaerythritol pentamethacrylate, trimethylolpropane dimethacrylate, trimethylolpropane trimethacrylate, glycerin dimethacrylate, and glycerin trimethacrylate, and the like may be mentioned, and one of them or two or more kinds of them may be mixed and used.

As non-limiting examples of the multifunctional allyl-based compounds, ethyleneglycol diallyl ether, diethyleneglycol diallyl ether, triethyleneglycol diallyl ether, tetraethyleneglycol diallyl ether, polyethyleneglycol diallyl ether, propyleneglycol diallyl ether, tripropyleneglycol diallyl ether, polypropyleneglycol diallyl ether, butanediol diallyl ether, butyleneglycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, and glycerin triallyl ether, and the like may be mentioned, and one of them or two or more kinds of them may be mixed and used.

As non-limiting examples of the multifunctional vinyl-based compounds, ethyleneglycol divinyl ether, diethyleneglycol divinyl ether, triethyleneglycol divinyl ether, tetraethyleneglycol divinyl ether, polyethyleneglycol divinyl ether, propyleneglycol divinyl ether, tripropyleneglycol divinyl ether, polypropyleneglycol divinyl ether, butanediol divinyl ether, butyleneglycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentainyl ether, trimethylolpropane divinyl ether, trimethylolpropane trivinyl ether, glycerin divinyl ether, and glycerin trivinyl ether, and the like may be mentioned, and one of them or two or more kinds of them may be mixed and used. Preferably, pentaerythritol triallyl ether may be used.

In the above explained multifunctional allyl-based compounds, or multifunctional vinyl-based compounds, two or more unsaturated groups included in the molecule respectively bind to the unsaturated bonds of water soluble ethylenically unsaturated monomers, or unsaturated bonds of other internal crosslinking agents, thus forming a crosslink structure during the polymerization process, and unlike acrylate-based compounds comprising an ester bond (—(C=O)O—) in the molecule, the crosslink may be more stably maintained during the neutralization process after the polymerization reaction.

Thus, gel strength of prepared super absorbent polymer may increase, process stability during a discharge process after polymerization may increase, and extractable contents may be minimized.

The crosslinking polymerization of water soluble ethylenically unsaturated monomers in the presence of such an internal crosslinking agent may be conducted in the presence of a thickener, a plasticizer, a preservative, an antioxidant, and the like, as necessary.

In the monomer composition, the internal crosslinking agent may be used in an amount of 0.01 to 5 parts by weight, based on 100 parts by weight of the water soluble ethylenically unsaturated monomers. For example, the internal crosslinking agent may be used in an amount of 0.01 parts by weight or more, or parts by weight or more, or 0.1 parts by weight or more, and 5 parts by weight or less, or 3 parts by weight or less, or 2 parts by weight or less, or 1 part by weight or less, or 0.7 parts by weight or less, based on 100 parts by weight of the water soluble ethylenically unsaturated monomers. If the content of the internal crosslinking agent is too low, crosslinking may not sufficiently occur, and thus, it may be difficult to realize strength above an optimum level, and if the content of the internal crosslinking agent is too high, the internal crosslinking density may increase, and thus, it may be difficult to realize desired centrifuge retention capacity.

The polymer formed using such an internal crosslinking agent has a three-dimensional network structure in which main chains formed by polymerization of the water soluble ethylenically unsaturated monomers are crosslinked by the internal crosslinking agent. As such, in case polymer has a three-dimensional network structure, compared to a two-dimensional linear structure that is not additionally crosslinked by an internal crosslinking agent, the properties of super absorbent polymer such as centrifuge retention capacity and absorbency under pressure may be remarkably improved.

The polymerization reactor 10 according to the embodiment of the invention is continuous polymerization reactor 10 using a thermal polymerization method. The continuous polymerization reactor 10 and continuous polymerization reaction system comprising the same will be explained later.

In the common preparation method of super absorbent polymer, the polymerization method is largely divided into thermal polymerization and photopolymerization according to polymerization energy source, and commonly, thermal polymerization may be progressed in a reactor equipped with a stirring axis such as a kneader, and photopolymerization may be progressed in a reactor equipped with a movable conveyor belt or in a flat-bottom container.

Meanwhile, by such a polymerization method, generally, polymer having modest molecular weight and wide molecular weight distribution is formed according to short polymerization reaction time (for example, 1 hour or less).

Meanwhile, in case photopolymerization is progressed in a reactor equipped with a movable conveyor belt or in a flat bottom container, hydrogel polymer sheet having a width of the belt is commonly obtained, and the thickness of the polymer sheet may vary according to the concentration of introduced monomer composition and introduction speed or introduction amount, but commonly, it may be about 0.5 to about 5 cm.

However, in case the monomer composition is supplied such that the thickness of the polymer sheet becomes too thin, production efficiency may be low, and in case the thickness of polymer sheet is increased for productivity, a polymerization reaction may not uniformly occur over the whole thickness, and thus, it may be difficult to form high quality polymer.

And, since polymerization in the reactor equipped with a stirring axis and conveyor belt is continuously progressed while polymerization product moves and new monomer composition is fed to the reactor, polymers having different polymerization rates may be mixed, and thus, polymerization may not uniformly occur over the whole monomer composition, thus causing property deterioration.

However, according to one embodiment of the invention, by progressing polymerization with a continuous polymerization reactor 10 and continuous polymerization reaction system comprising the same, there is little concern about mixing of polymers having different polymerization rates, and thus, polymer having uniform quality may be obtained.

Meanwhile, since polymerization in the continuous polymerization reactor 10 according to one embodiment of the invention is conducted by a thermal polymerization method, a thermal polymerization initiator is used as the polymerization initiator.

As the thermal polymerization initiator, one or more selected from the group consisting of persulfate-based initiators, azo-based initiators, hydrogen peroxide and ascorbic acid may be used. Specifically, as the examples of the persulfate-based initiators, sodium persulfate ($Na_2S_2O_8$), potassium persulfate ($K_2S_2O_8$), ammonium persulfate ($(NH_4)_2S_2O_8$), and the like, may be mentioned, and as the examples of the azo-based initiators, 2,2-azobis(2-amidinopropane) dihydrochloride, 2,2-azobis-(N,N-dimethylene) isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid), and the like may be mentioned. More various thermal polymerization initiators are stated in Odian, 'Principle of polymerization (Wiley, 1981)', p 203, but the invention is not limited thereto.

Such a polymerization initiator may be used in an amount of 2 parts by weight or less, based on 100 parts by weight of the water soluble ethylenically unsaturated monomers. Namely, if the concentration of the polymerization initiator is too low, polymerization speed may become slow, and remaining monomers may be extracted in large quantities in the final product. To the contrary, if the concentration of the polymerization initiator is too high, polymer chains making up a network may become short, and thus, extractable contents may increase, and absorbency under pressure may decrease, thus deteriorating properties of polymer.

Meanwhile, according to one embodiment of the invention, polymerization may be initiated by introducing the initiator together with a reducing agent forming a redox couple with the initiator.

Specifically, the initiator and reducing agent, when introduced in a polymerization solution, react with each other to form radicals.

The radicals formed react with monomers, and since the oxidation-reduction reaction between the initiator and reducing agent is highly reactive, even if small amounts of initiator and reducing agent are introduced, polymerization may be initiated, thus enabling low temperature polymerization without need to increase process temperature, and minimizing property change of the polymer solution.

The polymerization using oxidation-reduction reaction may smoothly occur at a temperature around a room temperature (25° C.) or lower temperature. For example, the polymerization reaction may be conducted at a temperature of 5° C. or more and 25° C. or less, or 5° C. or more and 20° C. or less.

In one embodiment of the invention, in case a persulfate-based initiator is used as the initiator, as the reducing agent, one or more selected from the group consisting of sodium metabisulfite ($Na_2S_2O_5$); tetramethyl ethylenediamine (TMEDA); a mixture of iron sulfate(II) and EDTA ($FeSO_4$/EDTA); sodium formaldehyde sulfoxylate; and disodium 2-hydroxy-2-sulfinoacteate may be used.

For example, potassium persulfate may be used as the initiator, and disodium 2-hydroxy-2-sulfinoacetate may be used as the reducing agent; ammonium persulfate may be used as the initiator, and tetramethyl ethylenediamine may be used as the reducing agent; or sodium persulfate may be used as the initiator, and sodium formaldehyde sulfoxylate may be used as the reducing agent.

In another embodiment of the invention, in case a hydrogen peroxide-based initiator is used as the initiator, the reducing agent may be one or more selected from the group consisting of ascorbic acid; sucrose; sodium sulfite ($Na_2SO_3$) sodium metabisulfite ($Na_2S_2O_5$); tetramethyl ethylenediamine (TMEDA); a mixture of iron sulfate(II) and EDTA ($FeSO_4$/EDTA); sodium formaldehyde sulfoxylate; disodium 2-hydroxy-2-sulfinoacteate; and disodium 2-hydroxy-2-sulfoacteate.

Besides, the monomer composition may further comprise additives such as a thickener, a plasticizer, a preservative, an antioxidant, and the like, as necessary.

And, the monomer composition may be prepared in the form of a solution dissolved in a solvent such as water, and the solid content in the monomer composition solution, i.e., the concentration of monomers, internal crosslinking agent and polymerization initiator may be appropriately controlled considering polymerization and reaction conditions, and the like. For example, solid content in the monomer composition may be 10 to 80 wt %, or 15 to 60 wt %, or 30 to 50 wt %.

Wherein, a solvent that can be used is not limited as long as it can dissolve the above explained components, and for example, water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methyl celosolve acetate and N,N-dimethylacetamide or mixtures thereof may be used.

Polymer obtained by such a method may have high molecular weight and uniform molecular weight distribution, and reduced extractable contents, because polymerization is conducted using non-neutralized ethylenically unsaturated monomers, Polymer obtained by such a method may have a moisture content of 30 to 80 wt %. For example, the moisture content of the polymer may be 30 wt % or more, or 45 wt % or more, or 50 wt % or more, and 80 wt % or less, or 70 wt % or less, or 60 wt % or less.

If the moisture content of polymer is too low, it may be difficult to secure appropriate surface area in the subsequent grinding step, and thus, the polymer may not be effectively ground, and if the moisture content of polymer is too high, pressure applied in the subsequent grinding step may increase, and thus, it may be difficult to grind to a desired particle size.

Meanwhile, throughout the specification, a "moisture content" is the content of moisture occupied, based on the total polymer weight, and it means a value obtained by subtracting the weight of dried polymer from the weight of polymer. Specifically, it is calculated by measuring weight decrease according to evaporation of moisture in the polymer while increasing the temperature of polymer in the state of crumb to dry through infrared heating. Wherein, a temperature is increased from a room temperature to about 180° C., and then, maintained at 180° C., and the total drying time is set to 40 minutes including 5 minutes of the temperature rise step.

Hereinafter, referring to FIG. 1 and FIG. 2, the continuous polymerization reactor for super absorbent polymer 10 and continuous polymerization reaction system comprising the same according to the embodiments of the invention will be explained in more detail.

FIG. 1 is a schematic diagram of the continuous polymerization reaction system for super absorbent polymer according to the embodiment of the invention, and FIG. 2 is a schematic diagram of the continuous polymerization reactor for super absorbent polymer according to the embodiment of the invention.

As shown in FIG. 1, the continuous polymerization reaction system for super absorbent polymer according to the embodiment of the invention comprises first, second, third vessels 100, 110 and 120, and a continuous polymerization reactor 10.

The first, second, third vessels 100, 110, and 120 are connected to the continuous polymerization reactor 10 through a feed pipe 104, and thus, feed water soluble ethylenically unsaturated monomers having acid groups, a solvent, an internal crosslinking agent, a polymerization initiator, and the like to the continuous polymerization reactor 10 through the feed pipe 104.

In the first vessel 100, water soluble ethylenically unsaturated monomers having acid groups, a solvent, and an internal crosslinking agent are mixed at a predetermined ratio, and a first feed valve 102 is equipped at the bottom of the first vessel 100 to connect the first vessel 100 with the feed pipe 104 or disconnect them. For example, in the first vessel 100, water soluble ethylenically unsaturated monomers having acid groups, an internal crosslinking agent, and a solvent are stored.

In the second vessel 110, a part of a polymerization initiator is stored at a predetermined ratio, and a second feed valve 112 is equipped at the bottom of the second vessel 110 to connect the second vessel 110 with the feed pipe 104 or disconnect them. For example, in the second vessel 110, a part of a thermal polymerization initiator is stored.

In the third vessel 120, the other part of a polymerization initiator is stored at a predetermined ratio, and a third feed valve 122 is equipped at the bottom of the third vessel 120 to connect the third vessel 120 with the feed pipe 104 or disconnect them. For example, in the third vessel 120, the other part of a thermal polymerization initiator is stored. Besides, additives such as an oxidation-reduction catalyst may be stored.

According to one example, the first, second, third vessels 100, 110, and 120 may be arranged in the order of the third, second, first vessels 120, 110, and 100 from the continuous polymerization reactor 10. Namely, the first vessel 100 is arranged farthest from the continuous polymerization reactor 10, and the third vessel 120 is arranged nearest to the continuous polymerization reactor 10, and the second vessel 110 is arranged between the first vessel 100 and the third vessel 120. Thus, if a monomer composition comprising water soluble ethylenically unsaturated monomers having acid groups, a solvent, and an internal crosslinking agent, and the like is fed from the first vessel 100 to the feed pipe 104, the second vessel 110 mixes a part of a polymerization initiator with the monomer composition, and the third vessel 120 finally mixes the other part of a polymerization initiator with the monomer composition, and thereby, the final monomer composition is fed to the continuous polymerization reactor 10 and a polymerization reaction occurs.

In the feed pipe 104, a pump 105 is arranged to facilitate feeding of water soluble ethylenically unsaturated monomers having acid groups, solvent, internal crosslinking agent, polymerization initiator, additives, and the like to the continuous polymerization reactor 10.

As shown in FIG. 2, the continuous polymerization reactor 10 according to the embodiment of the invention is construed so as to be fed with the final monomer composition from the feed pipe 104, and discharge hydrogel polymer formed by the polymerization reaction. For this purpose, an inlet 12 connected to the feed pipe 104 is formed at the upper part of the continuous polymerization reactor 10, an outlet 14 is formed at the lower part of the continuous polymerization reactor 10, and a discharge valve 16 is installed in the outlet 14. And, at the upper part of the continuous polymerization reactor 10, a cylindrical body 17 having generally constant diameter is formed, and a discharge part 18, of which diameter gradually decreases toward the outlet 14, is formed at the lower part of the body 17.

The discharge valve 16 is closed until a predetermined time passes from the time when the final monomer composition is fed to the continuous polymerization reactor 10, and after the predetermined time passes, it is opened. Namely, if the other part of a polymerization initiator is fed to the feed pipe 104 from the third vessel 120 to form the final monomer composition, a polymerization reaction begins to be progressed. The final monomer composition is fed to the continuous polymerization reactor 10, and a polymerization reaction is progressed in the continuous polymerization reactor 10 for the predetermined time to form hydrogel polymer. Thereafter, the discharge valve 16 opens the outlet 14 of the continuous polymerization reactor 10 to discharge hydrogel polymer formed. Thus, the predetermined time means a time interval from the time when the final monomer composition is formed to the time when polymerization is completed to form hydrogel polymer.

And, the discharge valve 16 may control an open rate of the outlet 14 such that hydrogel polymer may be discharged through the outlet 14 at the same flow rate as the flow rate of the final monomer composition fed to the continuous polymerization reactor 10 through the inlet 12.

For this purpose, the first, second, third feed valves 102, 112, and 122 and the discharge valve 16 may be electrically connected to a controller 130. Namely, the controller 130 sends a signal to the first feed valve 102 to control such that a monomer composition may be fed to the feed pipe 104 at a predetermined flow rate, sends a signal to the second feed valve 112 to control such that a part of a polymerization initiator is fed to the feed pipe 104 at a predetermined rate according to the flow rate of the monomer composition fed to the feed pipe 104, and sends a signal to the third feed valve 122 to control such that the other part of a polymerization initiator is fed to the feed pipe 104 at a predetermined rate according to the flow rate of the monomer composition fed to the feed pipe 104, thus controlling such that the final monomer composition is fed to the continuous polymerization reactor 10 at a predetermined flow rate. Wherein, the controller 130 controls the discharge valve 16 to close the outlet 14.

And, if a predetermined time passes from the time when the final monomer composition begins to be fed to the continuous polymerization reactor 10 at a predetermined flow rate, the controller 130 controls an open rate of the outlet 14 through the discharge valve 16 such that hydrogel polymer may be discharged at the same flow rate as the predetermined flow rate through the outlet 14.

Meanwhile, the controller 130 may judge a time to open the discharge valve 16, based on a predetermined volume, instead of a predetermined time. Namely, since a volume may be expressed by a product of a flow rate and time, if a predetermined volume of the final monomer composition is fed to the continuous polymerization reactor 10, the controller 130 may judge that a predetermined time passes, and open the discharge valve 16.

In order to obtain uniform concentration gradient of the final monomer composition in the continuous polymerization reactor 10, the ratio of the height (H1) to the diameter (D1) of the continuous polymerization reactor 10 should be set within the rage of 2 to 4. Namely, 2≤H1/D1≤4. Wherein, the diameter (D1) of the continuous polymerization reactor 10 indicates the diameter of the body 17, and the height (H1) of the continuous polymerization reactor 10 is the sum of the height (H2) of the body 17 and the sum (H3) of the discharge part 18. And, the central angle (θ1) of the discharge part 18 may be about 50° to about 70°.

If H1/D1 is less than 2, the flow rate of hydrogel polymer that can be discharged to the outlet 14 may be large, and thus, it may be difficult to control an open rate of the outlet 14 through the discharge valve 16, and due to a thin solution layer, the temperature of the final monomer composition may rapidly increase to generate side reactions during the polymerization reaction, and thus, extractable contents may increase in comparison with centrifuge retention capacity.

If H1/D1 is greater than 4, the temperature of the solution at the lower part of the continuous polymerization reactor 10 may be higher than the temperature of the solution at the upper part, and the solution may move up to the upper part of the continuous polymerization reactor 10, and thus, it may be difficult to progress a polymerization reaction at the same concentration for the same time. Thereby, a solution newly introduced at the upper part may be mixed with a solution being polymerized at the lower part, and a polymerization reaction may not be sufficiently conducted. Thus, extractable contents may increase in comparison with centrifuge retention capacity.

Thus, by setting the ratio of the height (H1) to the diameter (D1) of the continuous polymerization reactor 10 within a range of 2 to 4, a polymerization reaction may be progressed at uniform concentration, thereby preparing super absorbent polymer with uniform properties.

Thereafter, steps of neutralizing at least a part of the acid groups of the prepared polymer; micronizing the polymer in the presence of a surfactant to prepare hydrated super absorbent polymer particles; drying the hydrated super absorbent polymer particles to prepare dried super absorbent polymer particles; and grinding the dried super absorbent polymer particles to prepare super absorbent polymer particles may be conducted to prepare super absorbent polymer.

EXAMPLE

Example 1

While closing the outlet 14 of a continuous polymerization reactor 10 with a volume of 5.4 L, wherein the diameter (D1) of a continuous polymerization reactor 10 is 140 mm, the height (H2) of a body 17 is 350 mm, the height (H3) of a discharge part 18 is 61 mm, and the central angle (θ1) of a discharge part 18 is 60°, the final monomer composition was fed to the continuous polymerization reactor 10 using a pump 106 at the rate of about 330 g of distilled water, 0.35 g of pentaerythritol triallyl ether, 0.015 g of ascorbic acid, and 0.00015 g of iron sulfate per 100 g of acrylic acid. The feeding of the final monomer composition was continued until 80% (4.32 L) of the volume of the continuous polymerization reactor 10 was filled.

Simultaneously with feeding of the final monomer composition to the continuous polymerization reactor 10 at the above rate through an inlet 12, an outlet 14 was opened through a discharge valve 16 to discharge hydrogel polymer. Wherein, the final monomer composition was fed to the continuous polymerization reactor 10 at the flow rate of 0.7 L/hr, and hydrogel polymer was discharged from the continuous polymerization reactor 10 at the flow rate of 0.7 L/hr.

The hydrogel polymer discharged from the continuous polymerization reactor 10 was passed through crushing, drying, grinding, surface crosslinking, and the like, to prepare super absorbent polymer.

Super absorbent polymer samples were extracted every 6 hours, and centrifuge retention capacity (CRC) and extractable contents (EC) were measured and deviations thereof were calculated. The deviations of centrifuge retention capacity (CRC) and extractable contents (EC) were about 2%, respectively.

For reference, super absorbent polymer sample having diameter of 300 μm to 400 μm, classified with a sieve of ASTM standard was used for measurement, centrifuge retention capacity (CRC) was measured according to European Disposables and Nonwovens Association (EDANA) standard EDANA WSP 241.3, and extractable contents (EC) was measured as extractable contents after swelling for 1 hour according to EDANA method WSP 270.3.

Comparative Example 1

While closing the outlet of a batch polymerization reactor with the same dimension as Example 1, the final monomer composition was fed to the batch polymerization reactor at a rate of about 330 g of distiller water, 0.35 g of pentaerythritol triallyl ether, 0.015 g of ascorbic acid, and 0.00015 g of iron sulfate per 100 g of acrylic acid using a pump. The feeding of the final monomer composition was continued until 80% (4.32 L) of the volume of the batch type polymerization reactor was filled.

And then, the introduction of the final monomer composition was stopped, and a polymerization reaction was progressed for 6 hours.

After 6 hours passed, the outlet was opened to discharge hydrogel polymer, and it was subjected to crushing, drying, grinding, surface crosslinking, and the like to prepare super absorbent polymer. While repeating the above process, super absorbent polymer samples were extracted, and centrifuge retention capacity and extractable contents were measured and deviations thereof were calculated. The deviations of centrifuge retention capacity and extractable contents were respectively about 5%.

As can be seen from Example 1 and Comparative Example 1, using a continuous polymerization reactor 10 in which the introduction of a monomer composition and discharge of hydrogel polymer are simultaneously conducted, the deviations of centrifuge retention capacity and extractable contents may be reduced. Thus, super absorbent polymer with uniform properties can be prepared.

Example 2 to Example 5 and Comparative Example 2 and Comparative Example 3

While adjusting the ratio of the height (H1) to the diameter (D1) of the continuous polymerization reactor 10, super absorbent polymers were prepared by the same preparation method of super absorbent polymer as Example 1.

More specifically, according to Example 2, the ratio of the height (H1) to the diameter (D1) of the continuous polymerization reactor 10 was set to 2, and after closing the outlet 14, the final monomer composition of the same rate as Example 1 was fed to the continuous polymerization reactor 10 until 80% of the volume of the continuous polymerization reactor 10 was filled. And then, simultaneously with feeding of the final monomer composition at a predetermined flow rate, the outlet 14 was opened such that hydrogel polymer was discharged to the outlet 14 at the same flow rate as the above predetermined flow rate.

The hydrogel polymer discharged from the continuous polymerization reactor 10 was subjected to crushing, drying, grinding, surface crosslinking, and the like, to prepare super absorbent polymer.

Super absorbent polymer samples were extracted every 6 hours, and centrifuge retention capacity and extractable contents were measured and deviations thereof were calculated.

According to Example 3, the ratio of the height (H1) to the diameter (D1) of the continuous polymerization reactor 10 was set to 2.7, and the same process as Example 2 was conducted.

According to Example 4, the ratio of the height (H1) to the diameter (D1) of the continuous polymerization reactor 10 was set to 3.0, and the same process as Example 2 was conducted.

According to Example 5, the ratio of the height (H1) to the diameter (D1) of the continuous polymerization reactor 10 was set to 4.0, and the same process as Example 2 was conducted.

According to Comparative Example 2, the ratio of the height (H1) to the diameter (D1) of the continuous polymerization reactor 10 was set to 1.5, and the same process as Example 2 was conducted.

According to Comparative Example 3, the ratio of the height (H1) to the diameter (D1) of the continuous polymerization reactor 10 was set to 4.5, and the same process as Example 2 was conducted.

Centrifuge retention capacities (CRC), deviations of centrifuge retention capacity, extractable contents (EC), and deviations of extractable contents of Examples 2 to 5 and Comparative Examples 2 and 3 are as shown in Table 1.

TABLE 1

| | Test No. | Centrifuge retention capacity (CRC) (g/g) | Deviation of centrifuge retention capacity (%) | Extractable contents (wt %) | Deviation of extractable contents (%) |
|---|---|---|---|---|---|
| Example2 | 1 | 41.0 | 1.7 | 3.72 | 1.9 |
| | 2 | 40.3 | | 3.65 | |
| Example3 | 1 | 40.5 | 1.3 | 3.35 | 1.8 |
| | 2 | 41 | | 3.41 | |
| Example4 | 1 | 40 | 1.3 | 3.81 | 1.6 |
| | 2 | 39.5 | | 3.75 | |
| Example5 | 1 | 40.4 | 1.2 | 3.57 | 1.9 |
| | 2 | 39.9 | | 3.64 | |
| Comparative | 1 | 38 | 3.8 | 5.50 | 3.5 |
| Example2 | 2 | 36.2 | | 5.31 | |
| Comparative | 1 | 39 | 4.4 | 5.51 | 4.2 |
| Example3 | 2 | 37.3 | | 5.75 | |

As shown in Table 1, even if a continuous polymerization reactor 10 is used, if the ratio of the height (H1) to the diameter (D1) of the continuous polymerization reactor 10 is set to be less than 2 or greater than 4, deviations of centrifuge retention capacity and extractable contents may increase. Particularly, if the ratio of the height (H1) to the diameter (D1) of the continuous polymerization reactor 10 is set to be less than 2 or greater than 4, deviation of centrifuge retention capacity and deviation of extractable contents are as large as about 4%, respectively. However, if the ratio of the height (H1) to the diameter (D1) of the continuous polymerization reactor 10 is set to be 2 to 4, deviation of centrifuge retention capacity and deviation of extractable contents are less than 2%, respectively. Thus, in order to prepare super absorbent polymer with uniform properties, a continuous polymerization reactor 10 should be used, and the ratio of the height (H1) to the diameter (D1) of the continuous polymerization reactor 10 should be set in the range of 2 to 4.

Although preferable embodiments of the invention have been explained, the invention is not limited to the examples, and includes all the modifications within a range easily modified from the embodiments of the invention by a person having ordinary knowledge in the art and recognized as being equivalent.

The invention claimed is:

1. A continuous polymerization reaction system comprising:

a first vessel in which water soluble ethylenically unsaturated monomers having acid groups, a solvent, and an internal crosslinking agent are stored;

a second vessel in which a part of a polymerization initiator is stored;

a third vessel in which remaining part of the polymerization initiator is stored;

a continuous polymerization reactor including an inlet located at an upper part of the continuous polymerization reactor, through which a monomer composition including the water soluble ethylenically unsaturated monomers having acid groups, the solvent, the internal crosslinking agent and the polymerization initiator is introduced, and an outlet located at a lower part of the continuous polymerization reactor, through which hydrogel super absorbent polymer formed by polymerization of the monomer composition is discharged;

a feed pipe connected to the inlet so as to introduce the monomer composition;

a first feed valve connecting the first vessel with the feed pipe;

a second feed valve connecting the second vessel with the feed pipe;

a third feed valve connecting the third vessel with the feed pipe;

a discharge valve for opening or closing the outlet; and a controller for controlling operations of the first, second, and third feed valves and the discharge valve;

wherein the controller controls the first, second, and third feed valves such that the monomer composition is continuously introduced through the inlet with a predetermined flow rate, and controls the discharge valve such that the hydrogel super absorbent polymer is continuously discharged with the same flow rate as the predetermined flow rate.

2. The continuous polymerization reaction system according to claim 1, wherein the controller controls the discharge valve to close the outlet, and opens the first, second, and third feed valves such that the monomer composition is continuously introduced into the continuous polymerization reactor through the inlet.

3. The continuous polymerization reaction system according to claim 2, wherein the controller controls the discharge valve by opening the outlet when a predetermined time is passed from a time when the monomer composition begins to be introduced into the continuous polymerization reactor, or a predetermined volume of the monomer composition is introduced into the continuous polymerization reactor.

4. The continuous polymerization reaction system according to claim 1, wherein the first, second, and third vessels are sequentially arranged such that the third vessel is closest to the continuous polymerization reactor, and the first vessel is furthest from the continuous polymerization reactor.

5. The continuous polymerization reaction system according to claim 1, wherein the continuous polymerization reactor comprises a cylindrical body, and a discharge part having an inverted circular cone shape with a diameter decreasing downward, located at a lower part the cylindrical body, and a ratio (H1/D1) of a sum (H1) of a height of the cylindrical body and a height of the discharge part to a diameter (D1) of the body is 2 to 4.

* * * * *